United States Patent
Rodbro et al.

(10) Patent No.: US 9,264,377 B2
(45) Date of Patent: Feb. 16, 2016

(54) CONTROLLING DATA TRANSMISSION OVER A NETWORK

(75) Inventors: Christoffer Rodbro, Stockholm (SE); Stefan Strommer, Stockholm (SE)

(73) Assignee: Skype, Dublin (IE)

( * ) Notice: Subject to any disclaimer, the term of this patent is extended or adjusted under 35 U.S.C. 154(b) by 881 days.

(21) Appl. No.: 12/924,847

(22) Filed: Oct. 6, 2010

(65) Prior Publication Data

US 2011/0312283 A1 Dec. 22, 2011

(30) Foreign Application Priority Data

Jun. 18, 2010 (GB) .................... 1010312.5

(51) Int. Cl.
*G06F 15/16* (2006.01)
*H04L 12/923* (2013.01)
(Continued)

(52) U.S. Cl.
CPC .............. *H04L 47/762* (2013.01); *H04L 47/20* (2013.01); *H04L 47/801* (2013.01); *H04L 47/803* (2013.01); *H04L 47/822* (2013.01); *H04L 65/4007* (2013.01); *H04L 65/1086* (2013.01)

(58) Field of Classification Search
CPC ..... H04L 41/0896; H04L 47/10; H04L 47/22; H04L 47/2408; H04L 47/2416; H04L 47/803; H04L 47/822; H04L 5/0064; H04L 1/1854; H04L 41/5022; H04L 45/3065; H04L 47/2475
USPC ....................................................... 709/229
See application file for complete search history.

(56) References Cited

U.S. PATENT DOCUMENTS 5,892,754 A * 4/1999 Kompella et al. ............. 370/236
7,940,756 B1 * 5/2011 Duffy et al. .................... 370/389
(Continued)

FOREIGN PATENT DOCUMENTS

CN    1565142     1/2005
CN    101232459   7/2008
(Continued)

OTHER PUBLICATIONS

Luca De Cicco, Saverio Mascolo, and Vittorio Palmisano. 2008. Skype video responsiveness to bandwidth variations. In Proceedings of the 18th International Workshop on Network and Operating Systems Support for Digital Audio and Video (NOSSDAV '08). ACM, New York, NY, USA, 81-86. DOI=10.1145/1496046.1496065 http://doi.acm.org/10.1145/1496046.1496065.*

(Continued)

*Primary Examiner* — June Sison
(74) *Attorney, Agent, or Firm* — Danielle Johnston-Holmes; Micky Minhas

(57) ABSTRACT

Method, device and computer program product for controlling data transmission over a network wherein a plurality of applications are capable of execution at a device of the network to thereby access the network, and wherein control means of the device are configured to set respective bandwidth limitations and to limit the bandwidth of the network access of the applications in accordance with their respective bandwidth limitations, the plurality of applications comprising at least one real-time application. The method comprises the control means determining a current transmission condition, the current transmission condition being one of a current network condition and a current bandwidth requirement of one of the at least one real-time application. The control means dynamically adapts the respective bandwidth limitations for the applications in dependence upon the determined current transmission condition. The control means controls network access of the applications to thereby limit the bandwidth of the network access of the applications in accordance with their respective adapted bandwidth limitations.

21 Claims, 2 Drawing Sheets

(51) Int. Cl.
*H04L 12/813* (2013.01)
*H04L 12/927* (2013.01)
*H04L 12/911* (2013.01)
*H04L 29/06* (2006.01)

(56) References Cited

U.S. PATENT DOCUMENTS

| | | | |
|---|---|---|---|
| 2001/0023445 A1 | 9/2001 | Sundqvisr | |
| 2003/0002531 A1* | 1/2003 | Charzinski et al. | 370/468 |
| 2003/0221008 A1 | 11/2003 | England et al. | |
| 2004/0205752 A1* | 10/2004 | Chou et al. | 718/100 |
| 2004/0242219 A1* | 12/2004 | Oie et al. | 455/422.1 |
| 2007/0081462 A1* | 4/2007 | Gefflaut et al. | 370/235 |
| 2007/0127375 A1* | 6/2007 | Bae et al. | 370/229 |
| 2008/0049787 A1* | 2/2008 | McNaughton et al. | 370/468 |
| 2008/0279216 A1* | 11/2008 | Sharif-Ahmadi et al. | 370/465 |
| 2009/0164657 A1* | 6/2009 | Li et al. | 709/233 |
| 2009/0285201 A1* | 11/2009 | Ben-Haim et al. | 370/352 |
| 2010/0142379 A1* | 6/2010 | Kim et al. | 370/241 |
| 2010/0296521 A1* | 11/2010 | Martinez et al. | 370/468 |
| 2010/0332667 A1* | 12/2010 | Menchaca et al. | 709/228 |
| 2011/0170495 A1* | 7/2011 | Earnshaw et al. | 370/329 |

FOREIGN PATENT DOCUMENTS

| | | |
|---|---|---|
| EP | 1434458 | 6/2004 |
| GB | 2 386 282 A | 9/2003 |
| WO | WO-0189234 | 4/2001 |
| WO | WO-03075523 | 9/2003 |
| WO | WO-2011008515 | 1/2011 |

OTHER PUBLICATIONS

Notification of Transmittal of International Search Report and the Written Opinion of the International Searching Authority for Int'l Application No. PCT/EP2011/060150; Date Mailed: Jul. 18, 2011, 11 pp.

Rayana, R.B. et al., "Mobility Aware Application Manager for Mobile Networks," ITS Telecommunications, 2008. ITST 2008. 8th International Conference, IEEE, Piscataway, NJ, USA, Oct. 24, 2008, pp. 337-342, XP031402771.

"Search Report", GB Application No. 1010312.5, (Sep. 28, 2011), 1 page.

"Foreign Office Action", CN Application No. 201180030139.5, Aug. 5, 2014, 21 pages.

"Foreign Office Action", CN Application No. 201180030139.5, Jun. 3, 2015, 9 pages.

"Foreign Office Action", GB Application No. 1010312.5, Dec. 1, 2015, 5 pages.

"Foreign Office Action", CN Application No. 201180030139.5, Dec. 16, 2015, 8 pages.

* cited by examiner ated current transmission condition; and the control means controlling network access of the applications to thereby limit the bandwidth of the network access of the applications in accordance with their respective adapted bandwidth limitations.

CONTROLLING DATA TRANSMISSION OVER A NETWORK

RELATED APPLICATION

This application claims priority under 35 U.S.C. §119 or 365 to Great Britain Application No. 1010312.5, filed Jun. 18, 2010. The entire teachings of the above application are incorporated herein by reference.

FIELD OF THE INVENTION

This invention relates to controlling data transmission over a network. In particular the invention relates to controlling data transmission over a network when a plurality of applications are executed at a device of the network to thereby access the network.

BACKGROUND

In a multitasking environment, a device in a network can execute a plurality of applications which can thereby send and receive data on the network. The transmission of data to and from the device over the network is governed to facilitate the transmission of the data. Quality of Service (QoS) policies can be employed by setting different priorities for data used by different applications. The priorities can be set using the Differentiated Services Code Point (DSCP) value in the Internet Protocol as is known in the art. The DSCP value classifies the data into different classes. Routers in the network are configured to differentiate traffic based on its class as specified in the DSCP values. Each traffic class can be managed differently, ensuring preferential treatment for higher-priority traffic on the network. The priorities can be set by a system administrator or super user in the network. High priorities can be set for data for real-time applications and low priorities for bulk data (i.e. data for non real-time applications). If they support it, the network routers will then serve high priority packets over lower priority ones, thus providing less queuing delay in the network for data for the real-time application.

However, often a user of the device is not skilled in how to set up the priorities used in a QoS scheme. Furthermore, in order to implement a QoS scheme, the nodes in the network which are bottlenecks on an end-to-end connection between two communicating devices are required to support the implementation of the QoS scheme. Often, not all of the nodes at which bottlenecks occur in the network support the implementation of QoS schemes.

SUMMARY

In a first aspect of the invention there is provided a method of controlling data transmission over a network wherein a plurality of applications are capable of execution at a device of the network to thereby access the network, and wherein control means of the device are configured to set respective bandwidth limitations and to limit the bandwidth of the network access of the applications in accordance with their respective bandwidth limitations, the plurality of applications comprising at least one real-time application, the method comprising: the control means determining a current transmission condition, the current transmission condition being one of a current network condition and a current bandwidth requirement of one of the at least one real-time application; the control means dynamically adapting the respective bandwidth limitations for the applications in dependence upon the determined current transmission condition; and the control means controlling network access of the applications to thereby limit the bandwidth of the network access of the applications in accordance with their respective adapted bandwidth limitations.

In a second aspect of the invention there is provided a device for controlling data transmission over a network, the device being configured to execute a plurality of applications which access the network, the plurality of applications comprising at least one real-time application, the device comprising control means, the control means comprising: setting means for setting respective bandwidth limitations for the applications for use in accessing the network; controlling means for controlling network access of the applications to thereby limit the bandwidth of the network access of the applications in accordance with their respective bandwidth limitations; determining means for determining a current transmission condition, the current transmission condition being one of a current network condition and a current bandwidth requirement of one of the at least one real-time application; and adaptation means for dynamically adapting the respective bandwidth limitations for the applications in dependence upon the determined current transmission condition, wherein the control means is configured to limit the bandwidth of the network access of the applications in accordance with their respective adapted bandwidth limitations.

In a third aspect of the invention there is provided a computer program product comprising computer readable instructions for execution by computer processing means at a device of a network for controlling data transmission over the network, wherein a plurality of applications are capable of execution at the device to thereby access the network, and wherein control means of the device are configured to set respective bandwidth limitations and to limit the bandwidth of the network access of the applications in accordance with their respective bandwidth limitations, the plurality of applications comprising at least one real-time application, the instructions comprising instructions for: determining a current transmission condition, the current transmission condition being one of a current network condition and a current bandwidth requirement of one of the at least one real-time application; dynamically adapting the respective bandwidth limitations for the applications in dependence upon the determined current transmission condition; and controlling network access of the applications to thereby limit the bandwidth of the network access of the applications in accordance with their respective adapted bandwidth limitations.

In prior art systems, when applications are executed in a multitasking environment they are not aware of each other. The applications therefore do not take the bandwidth requirements of other applications into account apart from an indirect effect of loss/delay based rate control, such as via the QoS scheme described above. Moreover, the bandwidth requirements of many applications, such as peer-to-peer communications applications, over the network are highly varying over time, depending, for example, on whether a call is ongoing or not. There is provided herein a mechanism that sets bandwidth limitations for applications being executed at the device, and adapts the bandwidth limitations in dependence upon current network conditions and/or the time-varying bandwidth requirements of one or more of the real-time applications.

By limiting the bandwidth usage of the non real-time applications, more bandwidth is available for the real-time applications. It is advantageous to allow the real-time applications to have the bandwidth they require as this allows them to function correctly in real-time. Some applications can cope better with temporary limitations to their bandwidth (e.g. non real-time applications) since temporary network delays experienced by those applications may not be so critical to performance. The inventors have therefore realised that the bandwidth limitations on some applications (e.g. the non real-time applications) can be varied without causing severe degradations to the execution of those applications. Therefore when there is insufficient bandwidth for all of the applications to access the network with their optimum bandwidth, the bandwidth limitations of some applications (e.g. the non real-time applications) can be adapted to reduce access to the network for those applications. This allows other applications (e.g. the real-time applications) to access the network with their required bandwidths. Since the conditions on the network and the bandwidth requirement of the real-time applications vary over time, the inventors have realised that these variations should be determined dynamically in order to automatically determine how to adapt the bandwidth limitations of the applications accordingly.

Increasing the relative bandwidths of the real-time applications compared to the non real-time applications could also be achieved to some extent by gradually pushing more and more bandwidth onto the network, thereby introducing congestion on the network. However, this congestion will lead to loss and delay that is very degrading to the real-time applications. Therefore, directly limiting the bandwidth of the non real-time applications is advantageous, as impairment of the real-time applications can thus be avoided. As described above real-time applications are more sensitive to reductions in the bandwidth with which they can access the network, as compared to non real-time applications.

Netlimiter software exists which limits specific applications' network usage. Using the Netlimiter software, a user is presented with a list of applications that are currently accessing the network, and the user can manually set upper bandwidth limits for the individual applications.

However, with the method provided herein, instead of having to set the bandwidth limits manually as when using the Netlimiter software, the bandwidth limitations will be set automatically, taking network conditions and/or bandwidth requirements of the real-time application(s) into account. This allows the bandwidth limitations to be varied dynamically in accordance with the current transmission conditions without requiring action from the user, i.e. control means in the device perform the adaptation of the bandwidth limitations automatically. Furthermore, all of the bandwidth limitations can be removed (which is equivalent to setting the bandwidth limitations to infinity) when the real-time applications are inactive, or when there is plenty of bandwidth available, and thus the user will not experience lower performance of other applications (e.g. non real-time applications) when this is not necessary.

BRIEF DESCRIPTION OF THE DRAWINGS

For a better understanding of the present invention and to show how the same may be put into effect, reference will now be made, by way of example, to the following drawings in which.

DETAILED DESCRIPTION OF PREFERRED EMBODIMENTS

Figure 1:
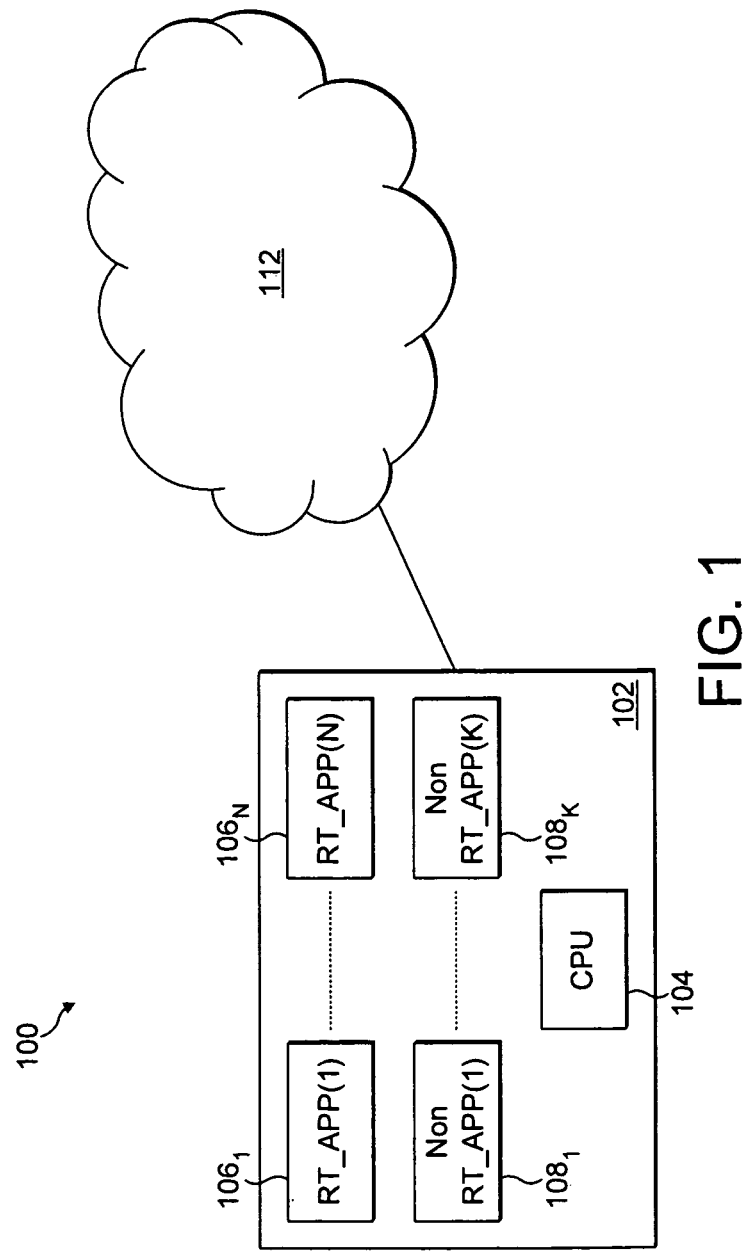
FIG. 1 is a schematic diagram of a network according to a preferred embodiment.

With reference to FIG. 1 there is now described a network 100 according to a preferred embodiment. The network 100 comprises a device 102 which is connected to the rest of the network 112, such that the device 102 can send data to, and receive data from, the rest of the network 112. As would be apparent to the skilled person there are many methods and protocols with which the device 102 can communicate with the rest of the network 112. The device 102 comprises a CPU 104, N real-time applications 106 (denoted $106_1$ to $106_N$ in FIG. 1) and K non real-time applications 108 (denoted $108_1$ to $108_K$ in FIG. 1). The applications 106 and 108 can be executed by the CPU 104 and can thereby access the network 112. The device 102 operates in a multitasking environment such that the applications 106 and 108 can be executed simultaneously and may require simultaneous access to the network 112. The network 100 is a communications network of which the device 102 is a part. In this sense the rest of the network 112 is external to the device 102. The network 100 can be used to communicate data between devices within the network 100. For example the device 102 can communicate with another device over the communication network 100.

Figure 2:
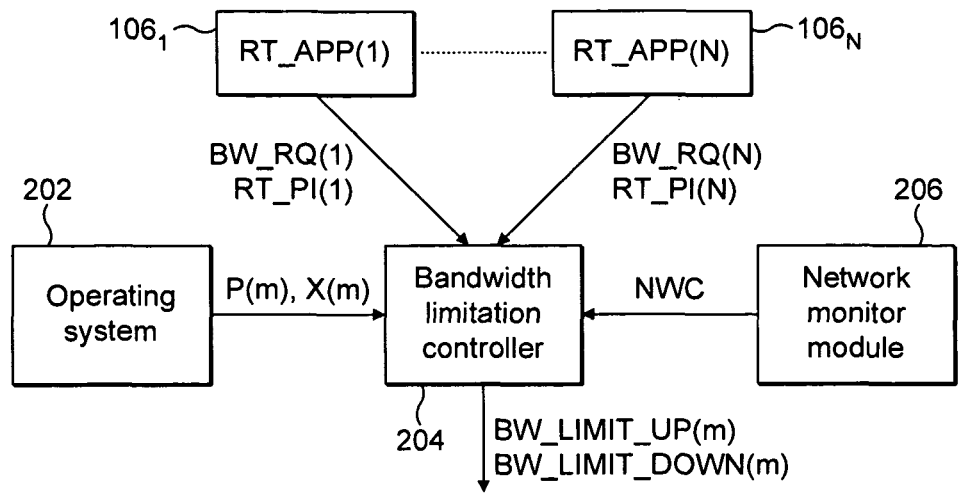
FIG. 2 is a schematic diagram of processing blocks in a device according to a preferred embodiment.

FIG. 2 a schematic diagram of processing blocks in the device 102 according to a preferred embodiment. The processing blocks shown in FIG. 2 comprise the real-time applications 106 which can be executed at the device 102, an operating system 202, a bandwidth limitation controller (BLC) 204 and a network monitor module (NMM) 206. The processing blocks shown in FIG. 2 can be implemented as hardware blocks in the device 102, or as software blocks which can, for example, be executed by the CPU 104 of the device 102.

As shown in FIG. 2 the bandwidth limitation controller (BLC) 204 can receive inputs from the operating system 202, the NMM 206 and the real-time applications 106. On a regular basis, the BLC 204 makes an inquiry to the operating system 202 about the applications (106 and 108) which are currently being executed and which can access the network 112. In response the operating system 202 provides the current network load (uplink and downlink traffic) of the applications (106 and 108) which are currently being executed. The applications execute processes and each process is identified by a process identifier (denoted PI(m) for process m). Furthermore, the network load data for each process is denoted by X(m), where m=1 ... M and M is the total number of currently executing processes. The total network load for the device 102 is given by X_TOT=X(1)+X(2)+ ... +X(M). In the preferred embodiment shown in FIG. 2 the operating system 202 sends the process identifiers PI(m) and their corresponding network load data X(m) to the BLC 204. In alternative embodiments, the total network load X_TOT may be reported instead of, or as well as, the individual network load data X(m). In further alternative embodiments network load data may not be reported to the BLC 204 at all (as described in further detail in the examples given below).

The BLC 204 also receives inputs from the real-time applications 106 as shown in FIG. 2. The data received at the BLC 204 from the real-time applications 106 includes their current bandwidth requirements (denoted BW_RQ in FIG. 2). The bandwidth requirements may be in the direct form of traffic requirements for the particular application, but may also be in a different form, such as a priority for the application. Each real-time application 106 also identifies itself to the BLC 204 with its own process identifier, denoted RT_PI in FIG. 2. In this way the bandwidth requirements of the real-time applications are reported to the BLC 204, such that the BLC 204 can take those requirements into account when dynamically adapting the bandwidth limitations that are used for the applications being executed in the device 102.

In preferred embodiments, the NMM 206 determines and supplies data to the BLC 204 regarding the current network conditions (NWC). As an example, the current network condition could be an estimate of the network uplink and downlink capacity currently available to the device 102 for accessing the rest of the network 112.

As shown in FIG. 2 the BLC 204 outputs bandwidth limitations for the different processes which are being executed at the device 102 (denoted BW_LIMIT_UP(m) for the uplink bandwidth limitation for process m and BW_LIMIT_DOWN (m) for the downlink bandwidth limitation for process m). These bandwidth limitations are used by the device 102 when executing the applications 106 and 108 such that the applications access the rest of the network 112 according to the bandwidth limitations determined by the BLC 204, as described in more detail below.

In some embodiments, the NMM 206 may be part of one of the real time applications 106. Furthermore, in some example embodiments, there is only one real-time application $106_1$ being executed at the device 102 (i.e. N=1) and the BLC 204 is part of the real-time application $106_1$ (RT_APP(1)).

Figure 3:
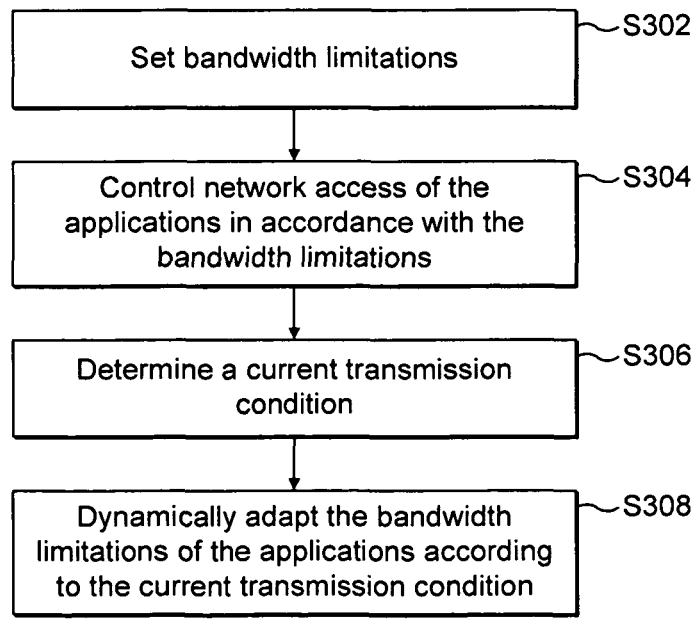
FIG. 3 shows a flowchart of a process for controlling data transmission over a network according to a preferred embodiment.

With reference to FIG. 3 there is now described a method of controlling data transmission over a network according to a preferred embodiment. In step S302 bandwidth limitations are set for at least the non real-time applications 108. Bandwidth limitations may also be set for the real-time applications 106. The bandwidth limitations are set by the BLC 204, and may be based upon the bandwidth requirements (BW_RQ) as reported from the real-time applications 106 and/or the network conditions (NWC) reported by the NMM 206.

The applications 106 and 108 are executed at the device 102. The applications are executed by the CPU 104 on the device 102. In step S304 the BLC 204 controls the network access of the applications to thereby limit the bandwidth of the network access of the applications in accordance with their respective bandwidth limitations. Thus the bandwidths of the network access of the executed applications 106 and 108 are limited in accordance with the bandwidth limitations that were set in step S302. Where the bandwidth limitations set in step S302 set upper limits for the bandwidth used by the applications 108 in accessing the network 112 then the network access of those applications 108 is limited such that they do not exceed their bandwidth limitations when accessing the network 112.

In step S306 a current transmission condition is determined. The current transmission condition describes the conditions in which the applications are currently accessing the network 112. The current transmission condition varies and affects the optimum bandwidths with which the applications access the network 112. Therefore as the current transmission condition varies it is useful to vary the bandwidths with which the different applications (106 and 108) access the network 112. This allows the device 102 to dynamically adapt to the transmission conditions it is currently experiencing in accessing the network 112.

For example, the current transmission condition may be a current network condition on the network. This is determined by the NMM 206 and reported to the BLC 204 (as shown in FIG. 2). For example the network 112 may be experiencing high congestion of data, in which case the bandwidth of the applications accessing the network 112 from the device 102 may need to be limited to a greater degree in order for the quality of the real-time applications 106 not to drop to unacceptable levels.

As another example, the current transmission condition may be a current bandwidth requirement of one of the real-time applications 106. When a real-time application (e.g. the first real-time application $106_1$) requires a high bandwidth, for example when it is a communication application and is currently engaging in a call over the network 100, then the bandwidth requirement (e.g. BW_RQ(1) shown in FIG. 2) is reported to the BLC 204 and the BLC 204 can reduce the bandwidth used by the other applications (e.g. the non real-time applications 108) to thereby allow the real-time application (RT_APP(1)) to use its required bandwidth. When the real-time application RT_APP(1) finishes the call, its bandwidth requirement BW_RQ(1) will decrease and the BLC 204 will dynamically adapt the bandwidth limitations of the other applications (in particular the non real-time applications 108) to automatically provide them with greater bandwidths, since the real-time application is no longer using such a high bandwidth.

In step S308 the BLC 204 dynamically adapts the bandwidth limitations of the applications according to the current transmission condition determined in step S306. In this way the device 102 automatically adapts the bandwidth limitations of the applications to suit the current transmission conditions, without requiring the user to have any input in, or even any knowledge of, the adaptation process.

In preferred embodiments, when the network access is to be limited, stricter bandwidth limitations are applied to the non real-time applications 108 than to the real-time applications 106 since the non real-time applications 108 can cope with delays better than the real-time applications 106 can cope with delays.

As described above, the BLC 204 may base the adaptations of the bandwidth limitations on one of a current network condition and a current bandwidth requirement of one of the real-time applications 106. However, in preferred embodiments, the BLC 204 will base the adaptations of the bandwidth limitations on both a current network condition and a current bandwidth requirement of one of the real-time applications 106. This allows the bandwidth limitations to be better suited to the transmission conditions in which the device 102 is operating.

As would be apparent to the skilled person the steps shown in FIG. 3 may be carried out in an order different to that shown in FIG. 3. The device 102 operates in a real-time multitasking environment and the applications 106 and 108 are executed in parallel with the control steps. At intervals the BLC 204 is queried (for example, as a part of the execution of a real-time application 106). In response the BLC 204 provides the bandwidth limitations. The BLC 204 obtains its inputs as shown in FIG. 2 in no particular order, and sets the bandwidth limitations accordingly.

In its most general form, the BLC 204 calculates uplink bandwidth limitations (BW_LIMIT_UP(m)) for the M processes according to the formula:

$$\text{BW\_LIMIT\_UP}(m) = f\_\text{UP}(\text{PI}(m), X(i), \text{NWC}, \text{BW\_RQ}(j), \text{RT\_RI}(j)),$$

where j identifies a particular application and $1 \leq j \leq N$, where i identifies a particular process and $1 \leq i \leq M$, and where f_UP is some appropriate function for calculating the uplink bandwidth limitation. There is a corresponding function f_DOWN for use in calculating the downlink bandwidth limitation BW_LIMIT_DOWN(m). It can be seen that the BLC 204 calculates the bandwidth limitation for a process m using a function which can vary with the process identifier m, the network load of all of the processes from m=1 to M, the network conditions as reported by the NMM 206 and the bandwidth requirement and process identifier as reported by the N real-time applications. By allowing the bandwidth limitations to vary as a function of all of these parameters the bandwidth limitations can be very well adapted to suit the current conditions in which the device accesses the network 112.

We now give some examples of how the bandwidth limitations can be automatically and dynamically adapted in the device 102 according to the current transmission conditions.

In a first simple example, network access for all other applications can be disabled when a real-time application 106$_n$ (RT_APP(n)) requests it. In this first example the real-time application 106$_n$ is provided with full access to the rest of the network 112 (i.e. the bandwidth limitation for the process corresponding to the real-time application 106$_n$ is removed). This is shown with the following pseudo code:

```
if ( PI(m) == RT_PI(n) )
    BW_LIM_UP(m) = infinity
else
    BW_LIM_UP(m) = 0
```

Here the bandwidth limitation for the process corresponding to the real-time application 106$_n$ is set to infinity, which has the same effect as removing the bandwidth limitation for that process because the bandwidth limitation does not limit the bandwidth of access to the network for the real-time application 106$_n$. However, all other processes are provided with no access to the rest of the network 112 by setting their bandwidth limitations to zero.

In a second example, the BLC 204 can be a more responsive to the current transmission conditions by not applying any bandwidth limitations if the current network conditions (NWC) determined by the NMM 206 and the total network load reported by the operating system 202 (X_TOT) indicate that there are currently plenty of network resources available, i.e. that all of the applications that are currently being executed can access the network simultaneously. In this second example, when the network conditions are such that the total network load of all of the applications can be accommodated in the network, then all of the applications being executed at the device 102 can be executed without any bandwidth limitations being imposed upon them. In this way, the applications can experience a greater quality of data transmission over the network 100.

In a third example there is just one real-time application 106$_1$ being executed (i.e. N=1), and the estimated network upload capacity is denoted Est_cap and the bandwidth requirement of the real-time application 106$_1$ is denoted BW_RQ(1). The estimated network upload capacity (Est_cap) is determined by the NMM 206 and reported to the BLC 204. The uplink bandwidth limitation BW_LIM_UP(m) for the m processes currently being executed are determined by the BLC 204 according to the following pseudo code:

```
if ( PI(m) == RT_PI(1) )
    BW_LIM_UP(m) = infinity
else
    BW_LIM_UP(m) = max(0, Est_cap - BW_RQ(1) ) / M.
```

This means that the bandwidth requirement (BW_RQ(1)) for the real-time application 106$_1$ is reserved and then the remaining "slack" bandwidth is divided over the other applications. In this way, the real-time application 106$_1$ is provided with the bandwidth it requires and then any remaining bandwidth capacity for accessing the network is divided between the non real-time applications 108. This allows the real-time application 106$_1$ to function correctly and allows the non real-time applications 108 to access the network 112 with as much bandwidth as is spare once the real-time application has reserved its required bandwidth.

In a more advanced scheme, as a variation of the third example, the network loads (X(i)) of the processes could be taken into account, so that applications using more bandwidth are assigned a larger share of the remaining bandwidth.

The bandwidth limitations described above can be implemented in a number of different ways, as would be apparent to a person skilled in the art. For example, the bandwidth limitations may be implemented in respect of a particular application by temporarily blocking the port that the application is using when the application exceeds the bandwidth limitation set for it. By blocking the port that an application is using, the application will experience packet loss, and an internal rate controller of the application can respond by decreasing the rate at which the application accesses the network. For example, if 100 kbps is allocated to an application and it attempts to access the network at 200 kbps, then the application has exceeded its allocated bandwidth limitation, and its port can be blocked. The application may or may not react to this blocking by lowering its bandwidth. If the application lowers its bandwidth the application can continue to operate correctly but at a lower bandwidth. If the application does not react by lowering its bandwidth, the port keeps being blocked, thereby preventing the application from accessing the network, until conditions are changed. In this way the application's network access is limited to thereby free bandwidth for the real-time application.

As an alternative to blocking ports, the quality-of-service (QoS) field of the socket associated with the port for the application in question can be modified. By lowering the QoS of the port, network routers in the network 100 will reduce priority for the packets sent via the port. In this way the application's network access can be limited to thereby free bandwidth for the real-time application. This alternative requires the network routers to support QoS filtering in order to have any effect on the bandwidth of the different applications.

As a further alternative, the bandwidth limitations may be enforced by utilizing a dedicated service installed in the system for setting bandwidth limitations. As an example, such a service could redirect the packets on the sockets in question to a local proxy, and apply the bandwidth limitations there using any method known in the art. The service may be provided in the operating system 202 of the device 102. Alternatively, the service may be provided by a dedicated application. The dedicated application may be a third party application or an application associated with the bandwidth limitation controller 204.

As another alternative, some specialized applications may be configured to operate in accordance with different bandwidth limitations. Such applications can be instructed to operate at a particular bandwidth. The application responds by operating at the particular bandwidth. Therefore the network access of the application can be limited without blocking its port, and instead by instructing the application to operate at a particular bandwidth in accordance with its bandwidth limitation. This can be a way to better guide the operation of the application, instead of simply blocking its port. In this way if the application supports it, the bandwidth limitation may be given as input to the application in question, so that it can adjust its bandwidth usage accordingly.

In some embodiments, a user of the device 102 can selectively enable or disable the method for dynamically adapting the bandwidth limitations. A user may decide that he does not want the BLC 204 to control the bandwidth limitations at all times and so he can disable the methods described above. This provides the user with control over the system, whilst at the same time, by enabling the methods described above, the BLC 204 can control the bandwidth limitations automatically without requiring input from the user to thereby dynamically adapt the bandwidth limitations in accordance with the current transmission conditions that the device 102 is experiencing.

While this invention has been particularly shown and described with reference to preferred embodiments, it will be understood to those skilled in the art that various changes in form and detail may be made without departing from the scope of the invention as defined by the appendant claims.

The invention claimed is:

1. A method comprising:
   determining a current transmission condition for a network accessible by a device, the current transmission condition including at least one current network condition for the network;
   executing, by the device, a real-time application and a non real-time application, where the real-time application executes a respective process;
   receiving, at a functionality separate from the real-time application and responsive to the execution of the real-time application, an input directly from the real-time application including a current bandwidth requirement of the real-time application and a process identifier associated with the real-time application, the process identifier specifying within the process identifier that the real-time application is a real-time application;
   in response to identifying the real-time application, automatically and dynamically adapting by the functionality separate from the real-time application, an existing bandwidth limitation for the non real-time application in dependence upon the determined current transmission condition and the current bandwidth requirement of the real-time application; and
   controlling, by the functionality separate from the real-time application, network access of the non real-time application to thereby limit the bandwidth of network access of the non real-time application in accordance with respective adapted bandwidth limitation of the non real-time application.

2. The method of claim 1 wherein the bandwidth limitation for the non real-time application is stricter than the bandwidth limitation for the real-time application.

3. The method of claim 1 further comprising determining a further current transmission condition, the further current transmission condition being the other one of the current network condition or the current bandwidth requirement of the real-time application, wherein the step of automatically and dynamically adapting the respective bandwidth limitation for the non real-time application is performed in dependence upon both the determined current transmission condition and the determined further current transmission condition.

4. The method of claim 1, further comprising in response to determining that the current bandwidth requirement of the real-time application is zero, adapting the respective bandwidth limitation for the non real-time application such that the bandwidth limitation does not limit the bandwidth of access to the network for the non real-time application.

5. The method of claim 1, further comprising responsive to determining that the current bandwidth of said real-time application is not zero, adapting the bandwidth limitation for the non real-time application to be zero.

6. The method of claim 1 further comprising determining a current network load for the real-time application, and automatically and dynamically adapting respective bandwidth limitation for the non real-time application in dependence upon the determined current network load for the real-time application.

7. The method of claim 1 further comprising determining a total current network load for the real-time application and the non real-time application, and automatically and dynamically adapting bandwidth limitation for the non real-time application in dependence upon the determined total current network load.

8. The method of claim 7 wherein if the determined current network condition and the determined total current network load indicate that the real-time application and the non real-time application can access the network simultaneously, then the respective bandwidth limitation for the non real-time application is adapted such that the bandwidth limitation does not limit the bandwidth of access to the network for the non real-time application.

9. The method of claim 1 wherein the determined current bandwidth requirement of the real-time application is reserved for the real-time application, and the remaining bandwidth capacity for accessing the network is divided between the non real-time application and one or more other applications by automatically and dynamically adapting the respective bandwidth limitations for the non real-time application and the one or more other applications accordingly.

10. The method of claim 9 wherein the remaining bandwidth capacity is determined using the determined current bandwidth requirement of the real-time application and an estimate of the total bandwidth capacity of the device for accessing the network.

11. The method of claim 9 further comprising determining a current network load for the real-time application, and dividing remaining bandwidth capacity for accessing the network between the non real-time application and one or more other applications in dependence upon the determined current network load for the real-time application.

12. The method of claim 1, further comprising applying the bandwidth limitation by at least one of: temporarily blocking a port that the non real-time application is using to access the network; modifying a quality-of-service field associated with a port that the non real-time application is using to access the network; utilizing a dedicated service for setting bandwidth limitations; or instructing the non real-time application to access the network in accordance with said at least one of the bandwidth limitations.

13. The method of claim 1 wherein the bandwidth limitation is one of an uplink bandwidth limitation and a downlink bandwidth limitation for the non real-time application.

14. A system comprising:
   one or more processors; and
   a memory device storing computer-readable instructions that are separate from a real-time application and a non real-time application and that are executable by the one or more processors to cause the system to perform operations including:
   setting a respective bandwidth limitation for the non real-time application for use in accessing a network;

controlling network access of the non real-time application to thereby limit the bandwidth of the network access of the non real-time application in accordance with the respective bandwidth limitation;

determining a current transmission condition, the current transmission condition including a current network condition;

in response to executing a real-time application on the system, receiving an input directly from the real-time application including a current bandwidth requirement of the real-time application and a process identifier specifying within the process identifier that the real-time application is a real-time application;

in response to identifying the real-time application, automatically and dynamically adapting the respective bandwidth limitation for the non real-time application in dependence upon the determined current transmission condition and the current bandwidth requirement of the real-time application; and limiting the bandwidth of the network access of the non real-time application in accordance with respective adapted bandwidth limitation.

15. The system of claim 14 wherein the operations further include:

determining a further current transmission condition, the further current transmission condition being the other one of the current network condition or the current bandwidth requirement of the real-time application; and automatically and dynamically adapting the respective bandwidth limitation for the non real-time application in dependence upon both the determined current transmission condition and the determined further current transmission condition.

16. The system of claim 14 wherein the operations further include determining a current network load for the real-time application; and automatically and dynamically adapting the respective bandwidth limitation for the non real-time application in dependence upon the determined current network load for the real-time application.

17. The system of claim 14 wherein the operations further comprise determining a total current network load for the real-time application and the non real-time application; and automatically and dynamically adapting the respective bandwidth limitation for the non real-time application in dependence upon the determined total current network load.

18. The system of claim 14, wherein the operations further comprise applying the bandwidth limitation by temporarily blocking a port that the non real-time application is using to access the network.

19. A system comprising:

one or more processors; and a memory device storing computer-readable instructions that are executable by the one or more processors to cause the system to perform operations including:

determining a current transmission condition, the current transmission condition including a current network condition;

receiving an input directly from a real-time application including a current bandwidth requirement of the real-time application and an identifier specifying within the identifier that the real-time application is a real-time application; in response to identifying the real-time application, dynamically adapting an existing bandwidth limitation for a non real-time application in dependence upon the determined current transmission condition and the current bandwidth requirement of the real-time application; and controlling network access of the non real-time application to thereby limit the bandwidth of the network access of the non real-time application in accordance with respective adapted bandwidth limitation.

20. A hardware memory device storing computer-readable instructions that are separate from a real-time application and a non real-time application and that are executable by the one or more processors to cause the device to perform operations comprising:

setting a respective bandwidth limitation for the non real-time application for use in accessing the network, where the bandwidth limitation includes setting an upper limit for the bandwidth used by the non real-time application in accessing the network;

controlling network access of the non real-time application to thereby limit the bandwidth of the network access of the non real-time application in accordance with respective bandwidth limitation;

determining a current transmission condition, the current transmission condition including a current network condition;

in response to executing a real-time application on the device, receiving an input directly from the real-time application including a current bandwidth requirement of the real-time application and a process identifier specifying within the process identifier that the real-time application is a real-time application;

in response to identifying the real-time application, automatically and dynamically adapting the respective bandwidth limitation for the non real-time application in dependence upon the determined current transmission condition and the current bandwidth requirement of the real-time application; and limiting the bandwidth of the network access of the non real-time application in accordance with respective adapted bandwidth limitation.

21. The method of claim 1, wherein the device executes a plurality of applications comprising at least one non real-time application.

* * * * *